United States Patent [19]

Yoon et al.

[11] Patent Number: 5,523,171
[45] Date of Patent: Jun. 4, 1996

[54] REINFORCED MATERIAL FOR AN AUTOMOBILE CONNECTING ROD

[75] Inventors: Byong-Eun Yoon, Kyungsangnam-do; Myung-Ho Kim, Seoul, both of Rep. of Korea

[73] Assignee: Hyundai Motor Company, Seoul, Rep. of Korea

[21] Appl. No.: 358,921

[22] Filed: Dec. 19, 1994

[30] Foreign Application Priority Data

Dec. 20, 1993 [KR] Rep. of Korea .................. 93-28617
Sep. 27, 1994 [KR] Rep. of Korea .................. 94-24271

[51] Int. Cl.⁶ .................. B32B 5/02; B32B 15/14; G05G 1/00
[52] U.S. Cl. .................. 428/608; 428/614; 74/579 R
[58] Field of Search .................. 428/608, 614, 428/627, 653, 685; 92/187; 74/579 R

[56] References Cited

U.S. PATENT DOCUMENTS

| | | | |
|---|---|---|---|
| 3,314,825 | 4/1967 | Forsytn | 428/608 |
| 3,371,407 | 3/1968 | Forsytn et al. | 428/608 |
| 3,663,723 | 5/1972 | Persson | 428/608 |
| 3,826,172 | 7/1974 | Dawson | 428/614 |
| 4,350,056 | 9/1982 | Ban et al. | 74/579 R |
| 4,425,820 | 1/1984 | Swozil | 74/579 R |
| 4,671,336 | 6/1987 | Anahara et al. | 74/579 R |
| 4,693,139 | 9/1987 | Mukai et al. | 74/579 E |

*Primary Examiner*—John Zimmerman
*Attorney, Agent, or Firm*—Finnegan, Henderson, Farabow, Garrett & Dunner

[57] ABSTRACT

A reinforced material for an automobile connecting rod prepared by rolling a straight-interwoven stainless steel wire mesh of about 100 to 200 mesh into a cylindrical shape, carbonitriding the stainless steel wire mesh, and placing the stainless steel wire mesh into a mold with a molten aluminum alloy is disclosed.

2 Claims, 9 Drawing Sheets

REINFORCED MATERIAL FOR AN AUTOMOBILE CONNECTING ROD

BACKGROUND OF THE INVENTION

1. Field of the Invention

The present invention relates to a reinforced material for an automobile connecting rod providing improved tensile strength and bending strength.

2. Description of the Related Art

To achieve high efficiency in an engine, the parts undergoing reciprocating and rotating motion at a high speed, notably the connecting rods linking the pistons and the crank shaft, need to have low weight, good abrasion resistance, and high strength. The strength requirement is important because connecting rods must bear a compressive force, a tensile force, and complex bending forces created by the crank motion.

Conventional reinforced materials for connecting rods are made by utilizing as a reinforcing core a bundle of stainless steel wire, each having a diameter of about 25 μm. The bundle is typically placed into a heat-resistant tube such as a quartz tube and heated to about 700° C. for ten minutes to promote partial fusion of the stainless steel wire. The core is then generally placed into a mold such as a squeeze casting mold with a molten aluminum alloy as a matrix metal and the material is cast under a force of 500 to 2000 kgf/cm². The molded article is then machined to form the connecting rod.

FIGS. 5, 6, and 7 are micrographs from a scanning electron microscope, or SEM, of connecting rod material made by this conventional process. FIG. 5 shows that the reinforcing fibers are relatively equally distributed in the metal matrix, and FIG. 6 shows that the reinforcing fibers are hexagonal-shaped. FIG. 7 shows the fibers to be partially fused due to the heating step discussed above.

The prior art method is undesirable because the stainless steel wire loses strength when the temperature is over 700° C. The aluminum in the metal matrix and the iron in the reinforcing stainless steel wire may react at these temperatures to form an intermetallic $Fe_mAl_n$ compound (such as $Fe_2Al_5$), which is a fragile material. This occurs because the solubility of steel in aluminum is as low as 0.01 to 0.12 wt. % at temperatures of 275°–600° C. As this intermetallic compound becomes thicker around the stainless steel fibers, the tensile strength and fracture elongation is reduced.

As a general rule, therefore, the formation of this intermetallic compound due to interfacial reaction between the metal matrix and the reinforcing fibers detrimentally affects the properties of the composite material. Linear reinforcing fibers are often used to try to minimize this reaction, but while such fibers have high tensile strength, the fracture strain is low.

Therefore, the need exists for a method of reinforcing a metal matrix while minimizing the formation of a fragile intermetallic compound at the interface between the reinforcing fibers and the metal matrix.

SUMMARY OF THE INVENTION

The present invention relates to a reinforced material for an automobile connecting rod prepared by rolling a straight-interwoven stainless steel wire mesh of about 100 to 200 mesh into a cylindrical shape, carbonitriding the stainless steel wire mesh, and placing the stainless steel wire mesh into a mold with a molten aluminum alloy. This reinforced material provides desirable tensile strength, bending strength, and fracture strain.

DETAILED DESCRIPTION OF THE INVENTION

The present invention relates to a reinforced material for an automobile connecting rod prepared by rolling a straight-interwoven stainless steel wire mesh of about 100 to 200 mesh into a cylindrical shape, carbonitriding the stainless steel wire mesh, and placing the mesh into a mold with a molten aluminum alloy. This reinforced material provides desirable tensile strength, bending strength, and fracture strain.

A method of preparing this reinforced material is as follows. A straight-interwoven steel wire mesh having a mesh of 100–200 is manufactured with stainless steel wire having a diameter equal to or less than 100 μm. The steel wire mesh is cut to the desired length and width and rolled up into cylindrical form. The rolled mesh is then carbonitrided and placed into a mold with molten aluminum to form a cast article which can be machined into a connecting rod.

If the diameter of the wire is more than 100 μm, it is difficult for the molten aluminum to permeate into the gaps of the stainless steel mesh. Additionally, if the mesh is greater than 200, the strength of the reinforcing wire of the mesh is negatively affected. The wires exhibit a wave shape in the straight-interwoven form, thus providing good tensile and bending strength, as well as good wetability in the molten aluminum alloy.

The reinforced material of the present invention is not damaged by cold strain because the thickness of the intermetallic compound formed between the reinforcing wires and the aluminum matrix alloy is kept between 2 and 10 μm. This thickness also promotes wetability, and improves fracture strength and fracture stretching rate. Carbonitriding on the surface of the reinforcing wires before molding minimizes the formation of the $Fe_mAl_n$ alloy. Increasing the amount of nitrogen on the surface of the stainless steel wire reduces the diffusion rate of aluminum atoms, further controlling the formation of the intermetallic compound.

Adding to the aluminum alloy 2 to 12 wt. % silicon, 1 to 2 wt. % copper, and 0.2 to 0.6 wt. % magnesium also limits formation of the intermetallic compound at the interface between the wires and the matrix metal. If the content of these metals is above or below these ranges, the aluminum matrix may have reduced fluidity and lower casting ability, and the capability of increasing the mechanical strength by heat treatment may also be reduced. Variations in tensile strength and elongation due to these elements are shown in FIGS. 1A, 1B, 2A, 2B, 3A, and 3B.

The present invention is represented by the Examples below, which are intended to be exemplary only.

EXAMPLE 1

Figure 8:
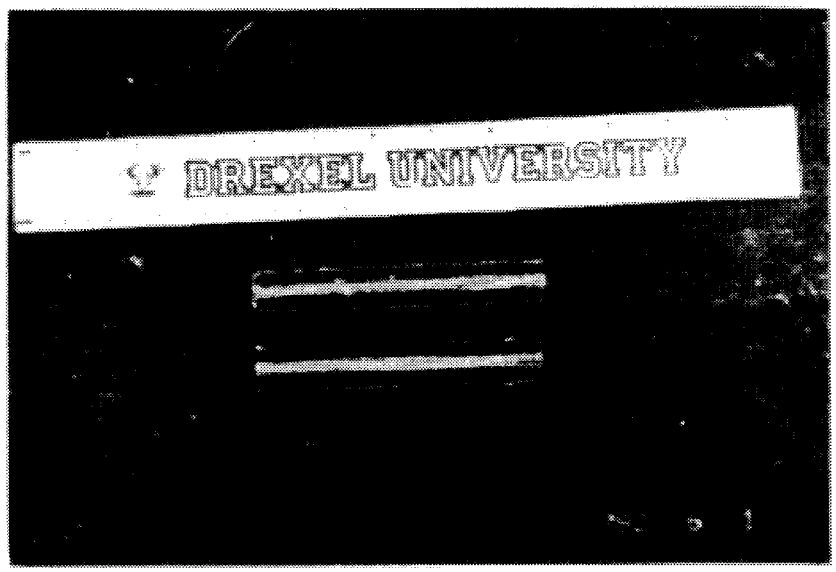
FIG. 8 shows a picture of a preformed body according to Example 1 of this invention.
Figure 9:
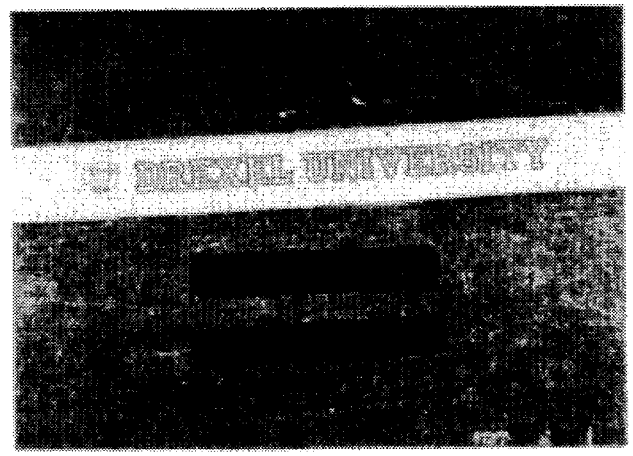
FIG. 9 shows a picture of preformed body carbonitrided according to Example 1 of this invention.
Figure 10:
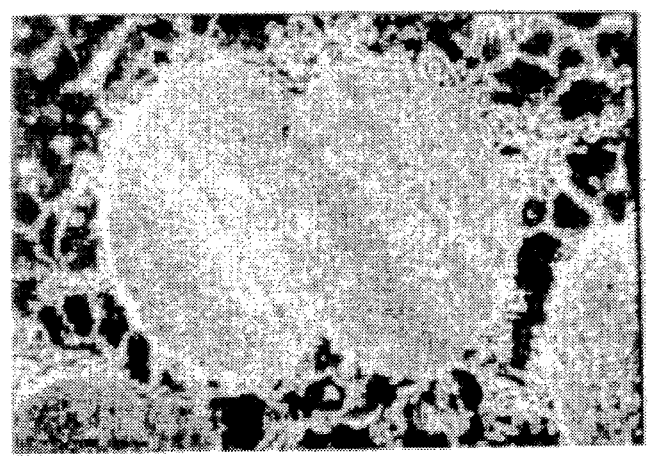
FIG. 10 shows an SEM picture of the interfacial reaction layer between stainless steel wire and matrix metal in cast state.
Figure 11:
FIG. 11 shows an SEM picture of the interfacial reaction layer between stainless steel wire and aluminum alloy matrix metal after a solution treatment for 1 hour.
Figure 12:
FIG. 12 shows an SEM picture of the interfacial reaction layer between stainless steel wire and aluminum alloy matrix metal after a solution treatment for 2 hours.
Figure 13:
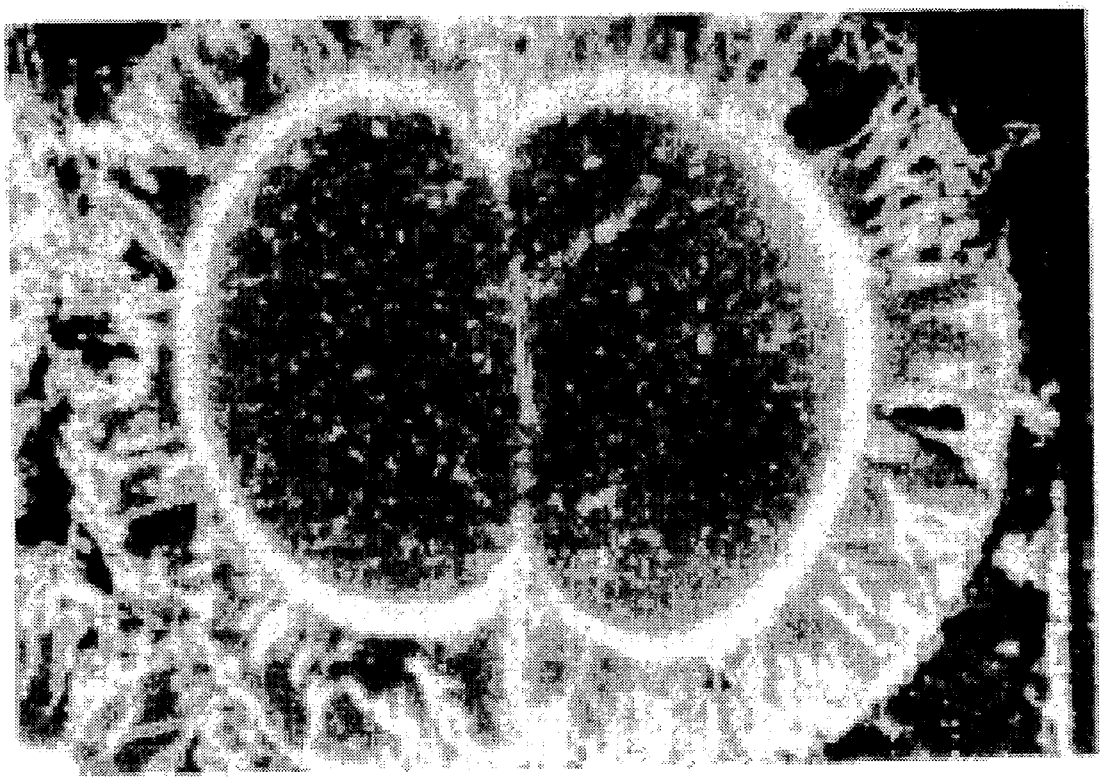
FIG. 13 shows an SEM picture of the interfacial reaction layer between stainless steel wire and aluminum alloy matrix metal after a solution treatment for 3 hours.

Stainless steel wire having a diameter of 100 μm was straight-interwoven at 45° and 90° into a sheet of 100 mesh. The mesh was rolled into a cylindrical shape to create a preform reinforcing body, as shown in FIG. 8. The body was the carbonitrided, as shown in FIG. 9.

The body was placed into a metallic mold with a molten aluminum alloy containing 93.32 wt. % aluminum, 5 wt. % silicon, 0.5 wt. % magnesium, and 1.18 wt. % copper. The mold was pressurized for 30 seconds with a plunger, to form the reinforced material of the present invention.

EXAMPLE 2

To examine the interfacial reaction between the aluminum alloy of Example 1 and carbonitrided stainless steel wire versus non-carbonitrided stainless steel wire, a solution and aging treatment was performed. The results are shown in FIGS. 4 and 10–13.

Figure 1A:
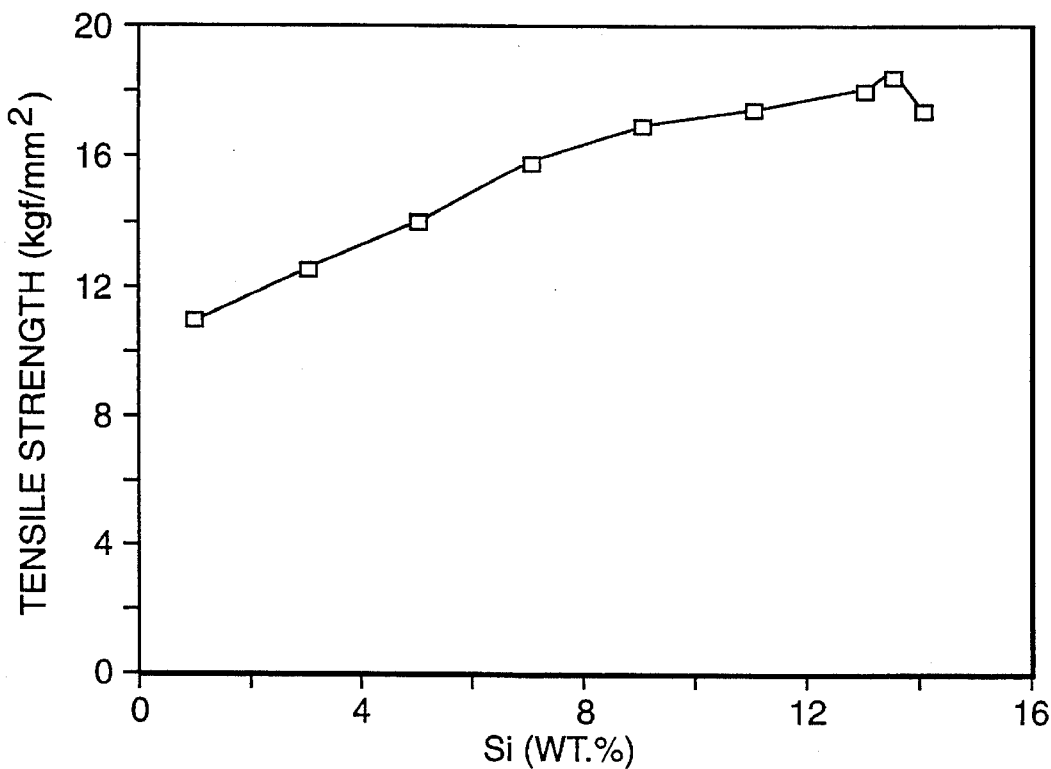
FIGS. 1A and 1B show graphs about variation of tensile strength and elongation rate, respectively, according to silicon content.
Figure 1B:
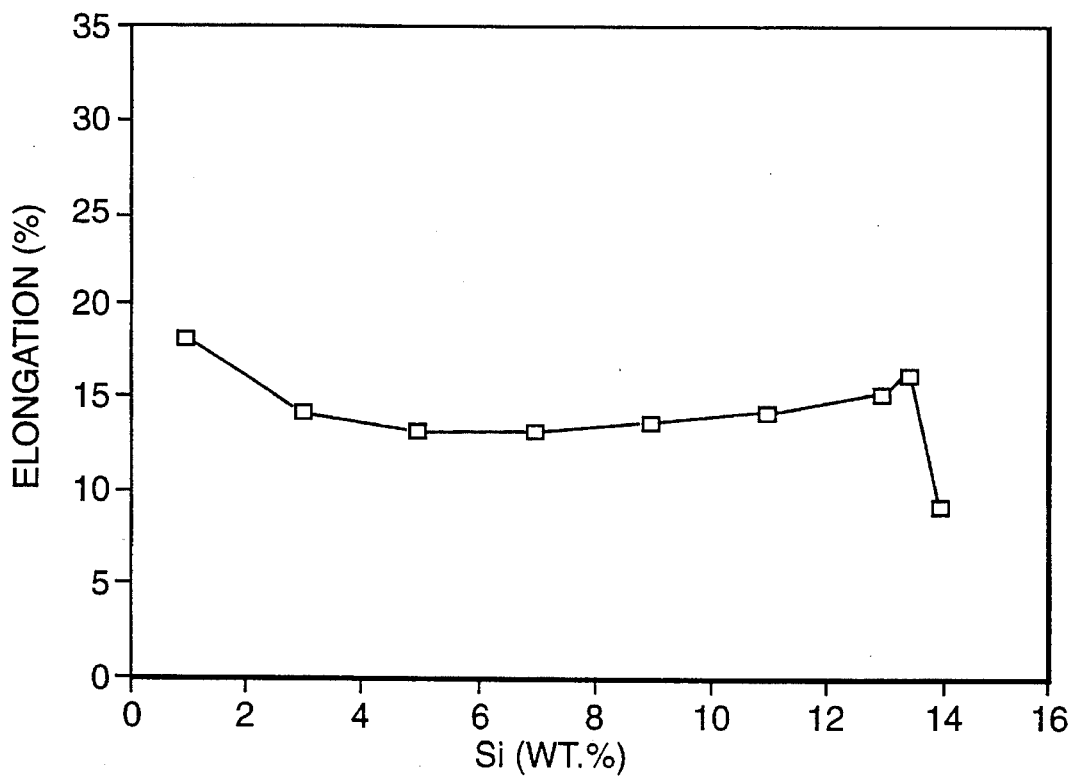
Figure 2A:
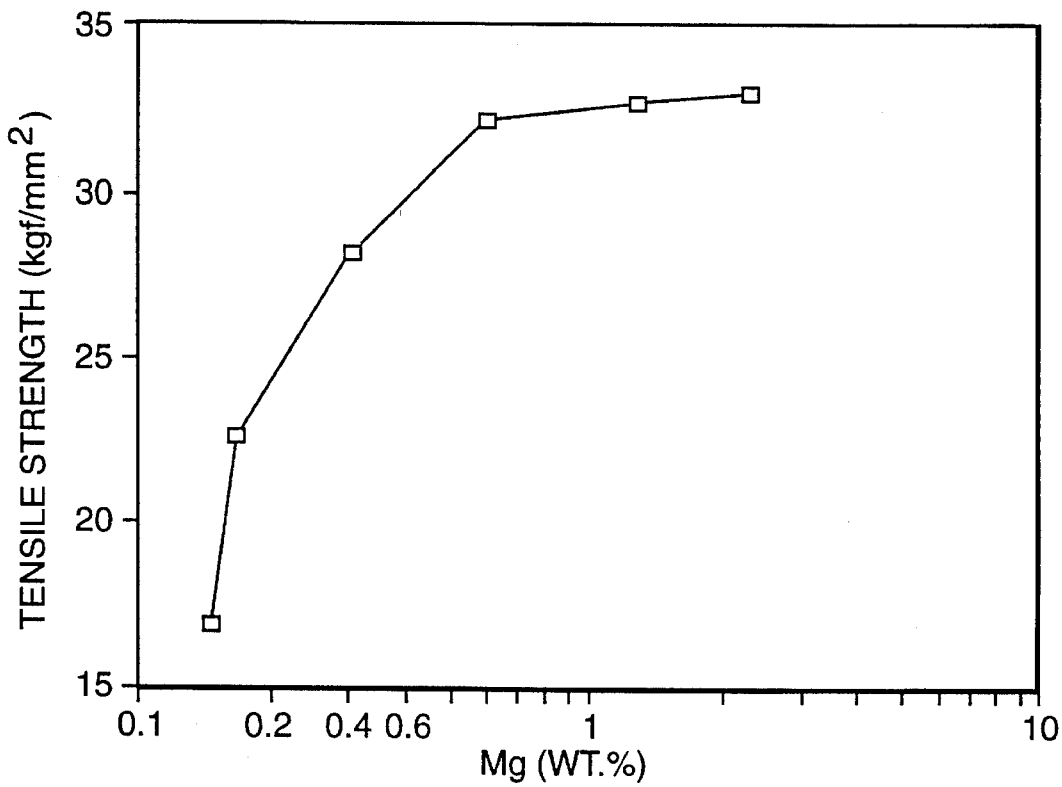
FIGS. 2A and 2B show graphs about variation of tensile strength and elongation rate, respectively, according to magnesium content.
Figure 2B:
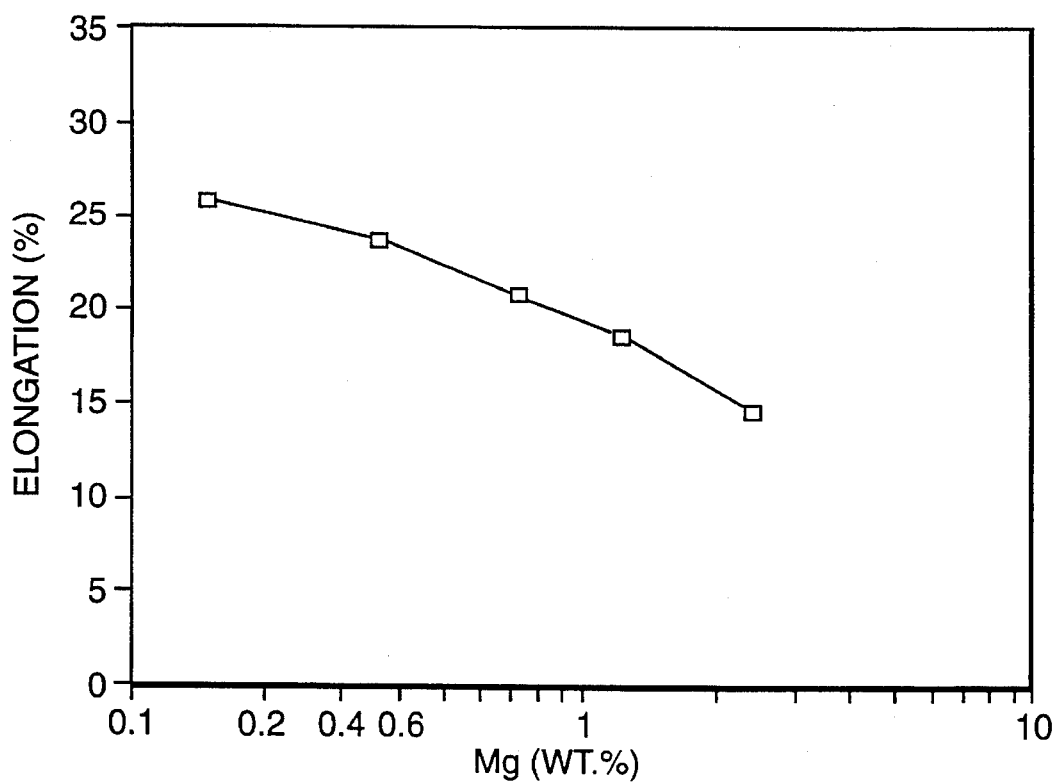
Figure 3A:
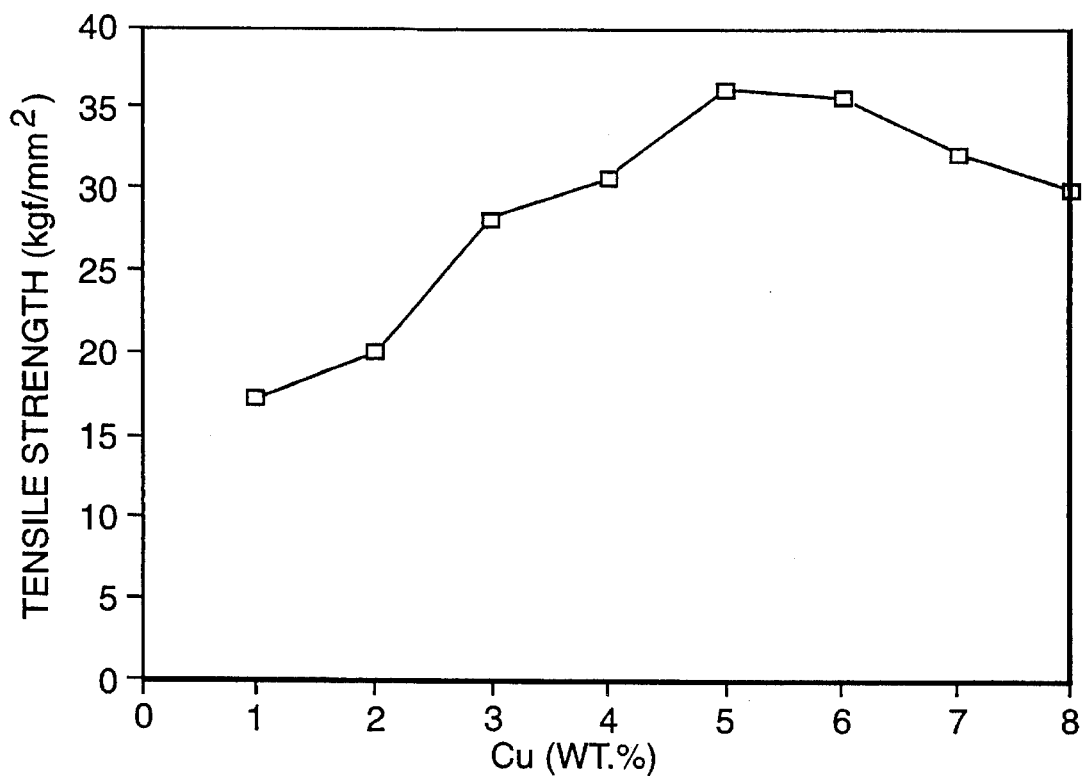
FIGS. 3A and 3B show graphs about variation of tensile strength and elongation rate, respectively, according to copper content.
Figure 3B:
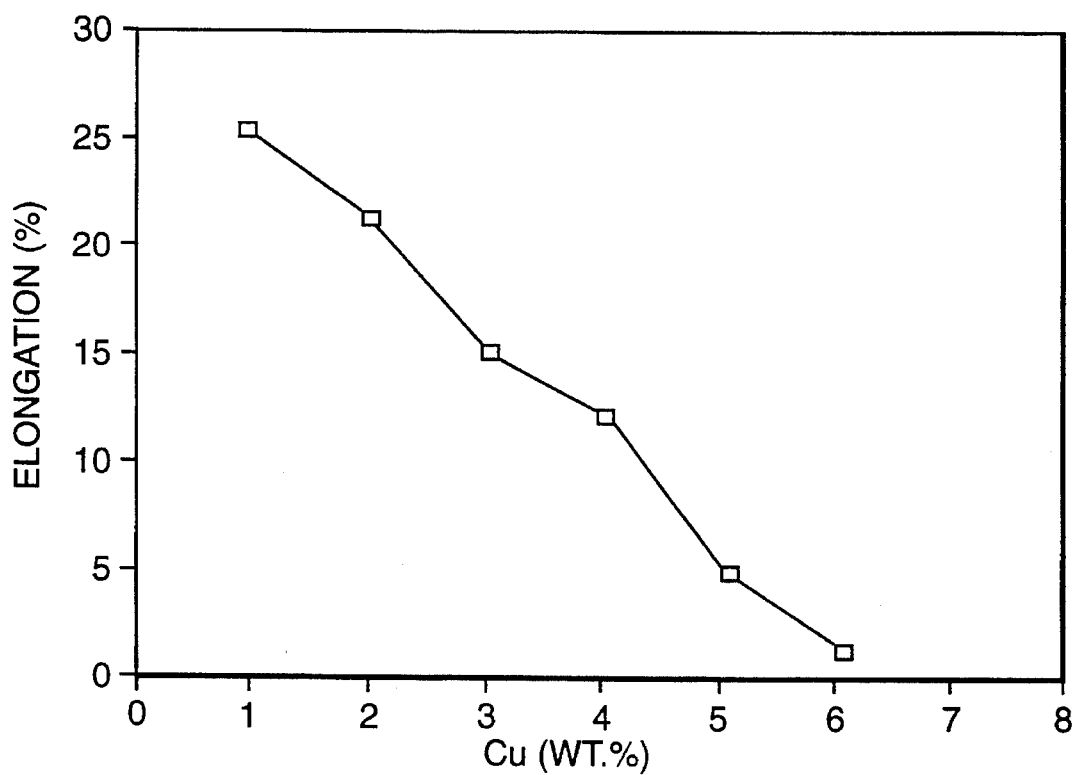
Figure 4:
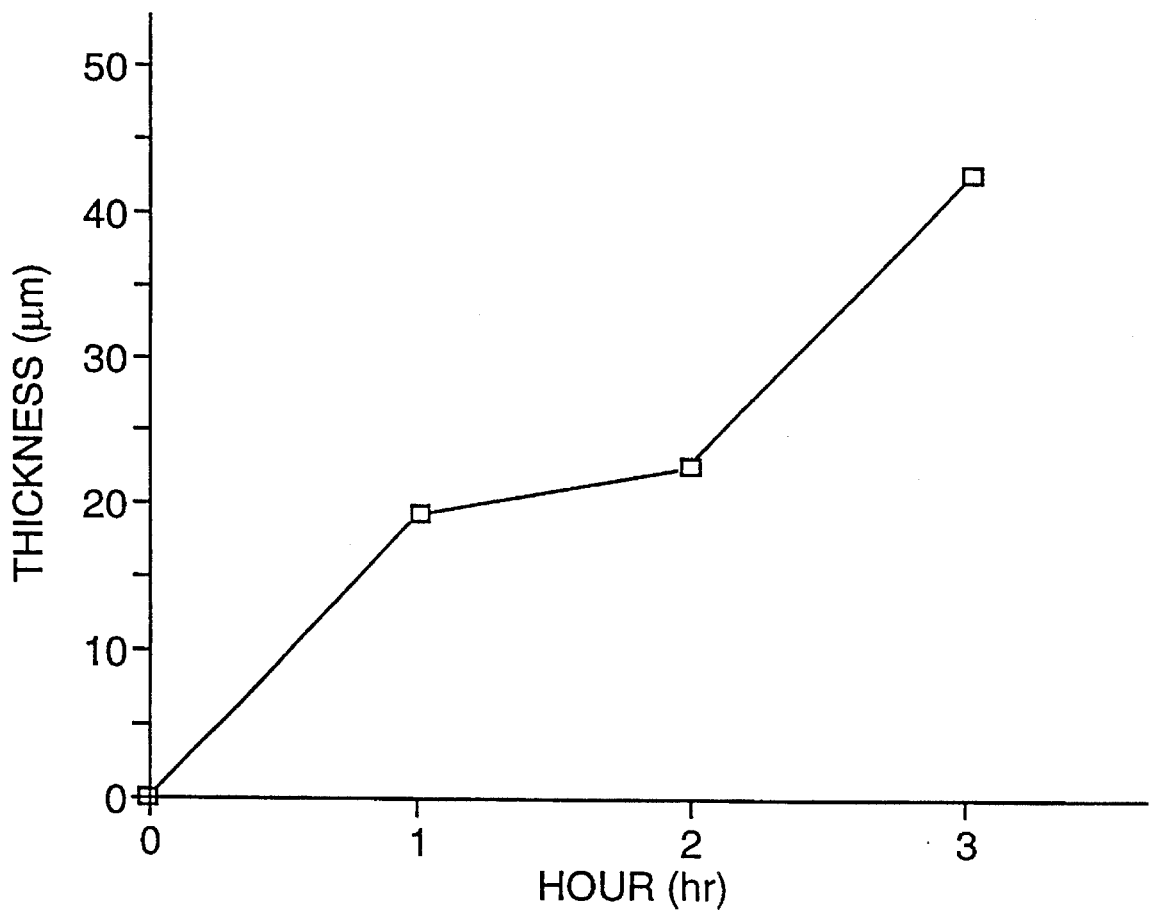
FIG. 4 shows a graph about variation of thickness of the interfacial reaction layer between non-carbonitrided stainless steel wire and aluminum alloy according to solution treatment times.
Figure 5:
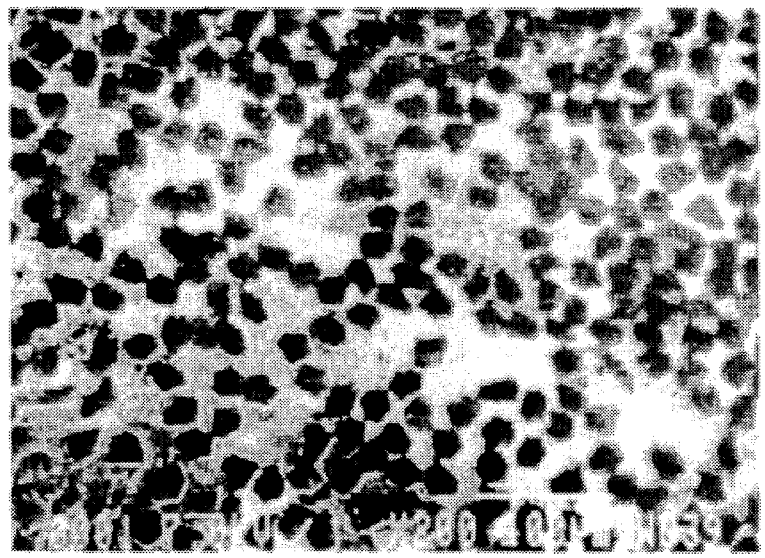
FIG. 5 shows a picture of SEM with low magnifications about core part of connecting rod composed of prior linear stainless steel wire and aluminium alloy.
Figure 6:
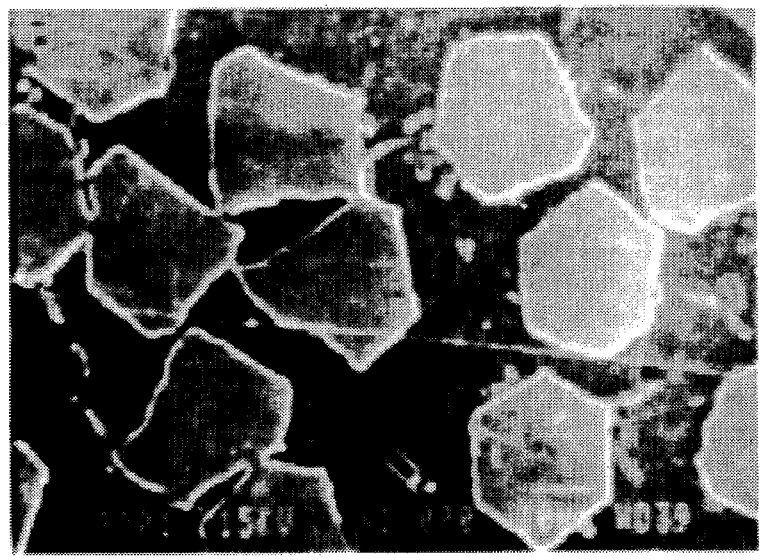
FIG. 6 shows a picture of SEM with high magnifications about core part of connecting rod composed of prior linear stainless steel wire and aluminium alloy.
Figure 7:
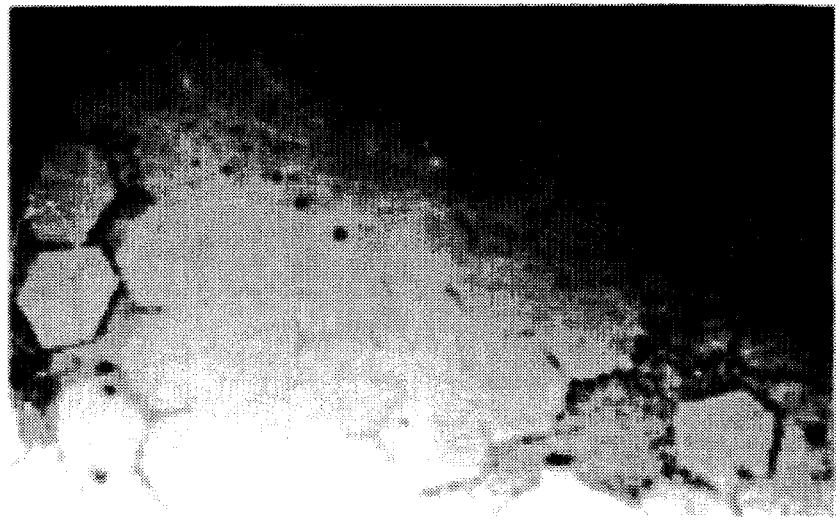
FIG. 7 shows a picture of SEM about mutual fused linear stainless steel wire in core part of connecting rod composed of prior linear stainless steel wire and aluminium alloy.

FIG. 4 shows that the use of non-carbonitrided stainless steel wire resulted a very small interfacial layer of an intermetallic compound initially, but after solution treatment for 3 hours or more, the layer grew to 40 μm or more. This thickness lowers mechanical properties such as tensile and fatigue strength.

FIGS. 10–13 show the carbonitrided stainless steel wire as cast, after solution treatment for 1 hour, after solution treatment for two hours, and after solution treatment for three hours, respectively. The Figures show that the interfacial layer did not grow markedly over the course of the solution treatment.

What is claimed is:

1. A reinforced material for an automobile connecting rod prepared by the process comprising the steps of:

rolling a straight-interwoven stainless steel wire mesh of 100 to 200 mesh into a cylindrical shape;

carbonitriding the stainless steel wire mesh; and placing the stainless steel wire mesh into a mold with a molten aluminum alloy.

2. A reinforced material of claim 1, wherein said aluminum alloy comprises 2 to 12 wt. % silicon, 1 to 2 wt % copper, and 0.2 to 0.6 wt. % magnesium.

* * * * *